Patented May 12, 1936

2,040,809

UNITED STATES PATENT OFFICE 2,040,809

PROCESS FOR THE MANUFACTURE OF A PROTEIN COMPOUND OF SULPHONATED HYDROCARBON SULPHUR BODIES

Eric T. Hessle, Chicago, Ill.

No Drawing. Application November 21, 1933, Serial No. 699,031

4 Claims. (Cl. 260—9)

This appplication is a continuation in part of my copending application, Serial No. 415,137, filed December 18, 1929, for Process for manufacture of a water soluble protein compound of sulphonated hydrocarbon sulphur bodies.

The object of the present invention is to produce a protein compound of sulphonated hydrocarbon sulphur bodies, and for this purpose I employ the sulphonation products produced by the process, as set forth in U. S. Patent 1,996,334, April 2, 1935. According to said process, sulphonated and neutralized hydrocarbon sulphur compounds of the thiophene series are produced by sulphonating and neutralizing a hydrocarbon oil which has been treated according to the process set forth in U. S. Patent No. 1,877,476. According to the process of this patent a crude oil is employed which contains a rather large amount of unsaturated hydrocarbons. This crude oil is distilled in the ordinary manner whereby kerosene and gasoline contained in it, and also the heavy asphaltic residue are removed, while the other fractions comprising a distillate are treated by a subsequent separate process to a reaction at an elevated temperature in which molecular sulphur and a catalytic agent are employed. The catalyst may consist of an oxygen of hydroxyl combination of one of the metals of the group consisting of chromium, manganese, iron, cobalt, nickel or one of the earth alkalis. The reaction product is distilled in the presence of a high vacuum and superheated steam and results in the formation of hydrocarbon sulphur compounds of heterocyclic nature such as thiophene and its derivatives. The product thus obtained is subsequently sulphonated and neutralized. These sulphonated and neutralized hydrocarbon sulphur compounds have very effective therapeutic and cosmetical properties.

According to the present process these products are chemically combined with a protein. The proteins found most satisfactory are the albumins, as egg albumen, serum albumin from blood and lact-albumin from milk, then casein, gelatine and peptone. For the purpose of the present process the step of neutralization of said sulphonated products may be omitted. The sulphonated and neutralized or unneutralized hydrocarbon sulphur compounds used in this process are water soluble and will not be precipitated by the addition of diluted acid, either organic or inorganic to the water solution. When a water solution of the neutralized sulphur compounds, as above mentioned, is mixed with a water solution of a protein only a physical mixture will occur, with no chemical action or precipitation, but if said acid is added to this mixture a sudden precipitation takes place. Instead of using the neutralized sulphonated product of my prior application, as above set forth, the product in its acid condition before neutralization can be used. When such a material is mixed with a neutral solution of one of the above mentioned proteins, a precipitation will take place without the addition of acid. The quantities to yield 100 parts of final product are forty parts of dry sulphonated hydrocarbon sulphur compounds as above specified and sixty parts of one of the above mentioned proteins. The precipitation is caused by the unneutralized sulphonic acid groups of the sulphonated product. For a complete chemical union, I have found that four parts of dry sulphonated products as above described, to six parts of one of the above mentioned proteins are necessary. The acids used may be either organic or inorganic. I have found that lactic, acetic, citric, and tartaric acids in five to ten per cent strength can be used, or the inorganic acids as sulphuric, hydrochloric and phosphoric acids in the strength of one to five per cent. The precipitated hydrocarbon sulphur protein compound being water insoluble is carefully washed to extract all traces of acid and also the inorganic salts originally contained in the sulphonated hydrocarbon sulphur compound. It is advisable to keep the wash water slightly acid by adding small amounts of acids such as mentioned above so as to prevent the dissolving of small amounts of the precipitate. The washing is repeated several times.

After the filtering and washing, the product is a pure neutral organic compound free of all inorganic salts.

In the final step the product may be dissolved in a dilute water solution of sodium bicarbonate, or another alkali such as ammonia, sodium carbonate, or sodium phosphate to a consistency of a thick syrup. The syrup is dried preferably with a vacuum drum dryer. This product thus obtained is a water soluble chemical combination of the above mentioned hydrocarbon sulphur compounds and the employed protein. This product has the advantages in that it is odorless, tasteless, and non-hygroscopic, non-oxidizable and non-toxic even when given in excess dosages. It also has the further advantage that it is water soluble. If the product is dried without being treated with alkali first, the drying is preferably accomplished in a rotary or shelf dryer and the finished product is water insoluble. Both the water soluble and water insoluble end products exert the same pharmaceutical actions.

What I claim is:

1. A compound of albumin and sulphonated hydrocarbon sulphur bodies of the structure of thiophene and its derivatives.

2. A compound of albumin and sulphonated heterocyclic hydrocarbon sulphur bodies which compound can be produced by reacting molecular sulphur with a hydrocarbon oil of noncyclic structure containing chemically combined sulphur in the presence of a catalyst consisting of one of the group of oxides and hydroxides of the metals chrominum, manganese, iron, cobalt, and nickel, distilling the products thus produced, sulphonating the distillate with fuming sulphuric acid in the cold, discarding the unreacted oil, adding concentrated sodium chloride brine and benzol thereby effecting a separation of the organic sulphonated mass dissolved in benzol and an underlying layer consisting of brine and excess sulphuric acid, which layer is discarded, neutralizing the benzol mixture, distilling off the benzol, dissolving the resulting product and its equal weight of albumin in water, precipitating with sulphuric acid, washing the precipitate with water and drying the resulting product.

3. A compound of albumin and sulphonated hydrocarbon sulphur bodies which bodies can be produced by reacting molecular sulphur with an unsaturated hydocarbon oil in the presence of a catalyst consisting of one of the group of oxides and hydroxides of the metals chromium, manganese, iron, cobalt, and nickel, distilling the product thus produced, sulphonating the distillate with fuming sulphuric acid in the cold, discarding the unreacted oil, adding concentrated sodium chloride brine and benzol thereby effecting a separation of the organic sulphonated mass dissolved in benzol and an underlying layer consisting of brine and excess sulphuric acid, which layer is discarded, neutralizing the benzol mixture, distilling off the benzol, dissolving the resulting product and its equal weight of albumin in water, precipitating with sulphuric acid, washing the precipitate with water and drying the resulting product.

4. The process of preparing a water soluble compound, which comprises treating with an alkali the water insoluble reaction products of albumin and sulphonated hydrocarbon sulphur compounds of the thiophene series.

ERIC T. HESSLE.